(12) United States Patent
Liu et al.

(10) Patent No.: US 9,753,904 B2
(45) Date of Patent: Sep. 5, 2017

(54) FAST RENDERING OF WEBSITES CONTAINING DYNAMIC CONTENT AND STALE CONTENT

(71) Applicant: QUALCOMM Incorporated, San Diego, CA (US)

(72) Inventors: Bojin Liu, San Diego, CA (US); Danis Rybnikov, Zichron Yakov (IL); Valeriya Perelman, Zichron Yakov (IL); Thomas Zakrajsek, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 14/809,046

(22) Filed: Jul. 24, 2015

(65) Prior Publication Data
US 2016/0026611 A1    Jan. 28, 2016

Related U.S. Application Data

(60) Provisional application No. 62/029,398, filed on Jul. 25, 2014.

(51) Int. Cl.
*G06F 17/00* (2006.01)
*G06F 17/22* (2006.01)
(Continued)

(52) U.S. Cl.
CPC ........ *G06F 17/2247* (2013.01); *G06F 17/218* (2013.01); *G06F 17/227* (2013.01);
(Continued)

(58) Field of Classification Search
CPC . G06F 17/2247; G06F 17/218; G06F 17/2211
See application file for complete search history.

(56) References Cited

U.S. PATENT DOCUMENTS

| 8,346,885 B2 | 1/2013 | Fainberg et al. |
| 9,275,167 B2 * | 3/2016 | Melnyk ............. G06F 17/30905 |

(Continued)

OTHER PUBLICATIONS

International Search Report and Written Opinion—PCT/US2015/042146—ISA/EPO—Oct. 9, 2015.

*Primary Examiner* — Stephen Hong
*Assistant Examiner* — Marshon Robinson
(74) *Attorney, Agent, or Firm* — Haynes and Boone, LLP (57) ABSTRACT

An example method of rendering a webpage includes generating a first serialized eventual document object model (DOM) based on processing a first Web document referenced by a location. The first serialized eventual DOM includes first in-lined dynamic content. The method also includes generating a second serialized eventual DOM based on processing a second Web document referenced by the location. The second serialized eventual DOM includes second in-lined dynamic content. The method further includes generating a common serialized eventual DOM based on a difference between the first and second serialized eventual DOMs. The common serialized eventual DOM includes static dynamic content included in the first and second serialized eventual DOMs, and the difference is true dynamic content. The method also includes rendering the common serialized eventual DOM to a display of a device.

20 Claims, 7 Drawing Sheets

(51) Int. Cl.
  *G06F 17/30* (2006.01)
  *G06F 17/21* (2006.01)
  *G06F 17/27* (2006.01)

(52) U.S. Cl.
  CPC ........ *G06F 17/2211* (2013.01); *G06F 17/272* (2013.01); *G06F 17/30905* (2013.01)

(56) References Cited

U.S. PATENT DOCUMENTS

| | | | |
|---|---|---|---|
| 2002/0122054 A1* | 9/2002 | Hind | G06F 17/30896 715/731 |
| 2002/0133627 A1* | 9/2002 | Maes | G06F 17/30905 709/246 |
| 2004/0049737 A1* | 3/2004 | Hunt | G06F 17/30905 715/238 |
| 2004/0133848 A1* | 7/2004 | Hunt | G06F 17/30905 715/273 |
| 2010/0037150 A1* | 2/2010 | Sawant | G06F 17/30896 715/753 |
| 2010/0262780 A1 | 10/2010 | Mahan et al. | |
| 2011/0258532 A1 | 10/2011 | Ceze et al. | |
| 2011/0258538 A1* | 10/2011 | Liu | G06F 17/2211 715/256 |
| 2012/0066586 A1 | 3/2012 | Shemesh | |
| 2012/0303697 A1 | 11/2012 | Alstad | |
| 2013/0227396 A1* | 8/2013 | Chinnathambi | G06F 17/212 715/235 |
| 2015/0046789 A1 | 2/2015 | Wei et al. | |
| 2015/0193399 A1* | 7/2015 | Woker | H04L 41/02 715/234 |
| 2016/0119344 A1* | 4/2016 | Freitas Fortuna dos Santos | H04L 63/1466 726/7 |

\* cited by examiner

FAST RENDERING OF WEBSITES CONTAINING DYNAMIC CONTENT AND STALE CONTENT

CROSS REFERENCE TO RELATED APPLICATIONS

This application claims the benefit of priority from U.S. provisional patent application No. 62/029,398, filed Jul. 25, 2014, which is incorporated herein by reference.

FIELD OF DISCLOSURE

The present disclosure generally relates to rendering content, and more particularly to rendering webpages.

BACKGROUND

Traditional techniques for fast webpage display rely on application developers to design webpages such that minimum JavaScript and CSS processing occurs for the first paint. This approach, however, is ill-suited for websites that contain a large amount of dynamic content generated by JavaScript. For example, some websites may have all of their user interface (UI) elements generated by JavaScript. Additionally, relying on webpage developers to make the webpages display faster may not be enough because webpage developer's choices of tools and/or libraries are limited. For example, webpage developers often rely on third-party libraries, which are typically implemented in JavaScript.

A conventional technique that is used to speed up operation on the browser or content delivery network (CDN) side is to use cached pages. This technique, however, is ill-suited for highly dynamic websites because stale information may be cached and later presented to users. If content that is generated by JavaScript is not displayed at all in order to prevent "stale" information from being shown, those websites containing a large amount of dynamic content will have minimum things to show. It may be desirable to render webpages quickly while avoiding these disadvantages.

BRIEF SUMMARY

This disclosure relates to rendering content.

According to some embodiments, an example method of rendering a webpage includes generating a first serialized eventual document object model (DOM) based on processing a first Web document referenced by a location. The first serialized eventual DOM includes first in-lined dynamic content. The method also includes generating a second serialized eventual DOM based on processing a second Web document referenced by the location. The second serialized eventual DOM includes second in-lined dynamic content. The method further includes generating a common serialized eventual DOM based on a difference between the first and second serialized eventual DOMs. The common serialized eventual DOM includes static dynamic content included in the first and second serialized eventual DOMs, and the difference is true dynamic content. The method also includes rendering the common serialized eventual DOM to a display of a device.

According to some embodiments, a system for rendering a webpage includes a client browser that generates a first serialized eventual document object model (DOM) based on processing a first Web document referenced by a location and generates a second serialized eventual DOM based on processing a second Web document referenced by the location. The first serialized eventual DOM includes first in-lined dynamic content and the second serialized eventual DOM including second in-lined dynamic content. The client browser generates a common serialized eventual DOM based on a difference between the first and second serialized eventual DOMs. The common serialized eventual DOM includes static dynamic content included in the first and second serialized eventual DOMs, and the difference is true dynamic content. The client browser renders the common serialized eventual DOM to a display of a device.

According to some embodiments, a computer-readable medium having stored thereon computer-executable instructions for performing operations includes generating a first serialized eventual document object model (DOM) based on processing a first Web document referenced by a location, the first serialized eventual DOM including first in-lined dynamic content; generating a second serialized eventual DOM based on processing a second Web document referenced by the location, the second serialized eventual DOM including second in-lined dynamic content; generating a common serialized eventual document object module (DOM) based on a difference between the first and second serialized eventual DOMs, the common serialized eventual DOM including static dynamic content included in the first and second serialized eventual DOMs, and the difference being true dynamic content; and rendering the common serialized eventual DOM to a display of a device.

According to some embodiments, a system for rendering a webpage includes means for generating a first serialized eventual document object model (DOM) based on processing a first Web document referenced by a location, the first serialized eventual DOM including first in-lined dynamic content; means for generating a second serialized eventual DOM based on processing a second Web document referenced by the location, the second serialized eventual DOM including second in-lined dynamic content; means for generating a common serialized eventual DOM based on a difference between the first and second serialized eventual DOMs, the common serialized eventual DOM including static dynamic content included in the first and second serialized eventual DOMs, and the difference being true dynamic content; and means for rendering the common serialized eventual DOM to a display of a device.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Render the Webpage
   A. Build Eventual DOM Based on the Original DOM
   B. Serialize the Eventual DOM
      1. Build Serialized Eventual DOM Corresponding to Visual Representation of Eventual DOM
      2. Serialize the Eventual DOM into a File
   C. Identify and Process the True and Static Dynamic Content
   D. Mechanisms for Serialized Eventual DOM Management and Delivery
   E. Mechanisms for Displaying the Requested Webpage
      1. Dual Render Process Approach
      2. Embedded JavaScript Approach
IV. Example Method
V. Example Device I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides a browser/server framework to achieve the contradictory requirements of fast rendering of non-stale dynamic contents as much as possible without requiring web developers to change their websites. Many popular websites have dynamic content generated on the client side using a client-side scripting. It may be desirable to render webpages with dynamic contents quickly, and as much as possible, while showing minimum stale information. Static dynamic content may refer to, for example, frames, layout, side bar, menus, post templates, a friends list, etc. True dynamic content may refer to any content (e.g., a newsfeed) that changes quite often across page loads.

To render webpages quicker, the present disclosure provides techniques such as serialization of an eventual DOM, dynamic content identification and processing (to avoid showing stale information), mechanisms for generating a serialized eventual DOM (for management and delivery of content), and mechanisms for displaying a serialized eventual DOM and the real webpage (also how to use the eventual DOM). The DOM after the webpage is fully loaded may be referred to as the "eventual DOM" of a webpage.

An embodiment that includes one or more techniques described in the present disclosure may display even the most dynamic websites faster, avoid stale information from being displayed to the user, and/or preserve dynamically generated, but non-changing items for fast display. Additionally, the solution may be implemented in a browser with or without a server's assistance. Accordingly, it may be unnecessary for the developer to change the original website.

II. Example System Architecture

Figure 1:
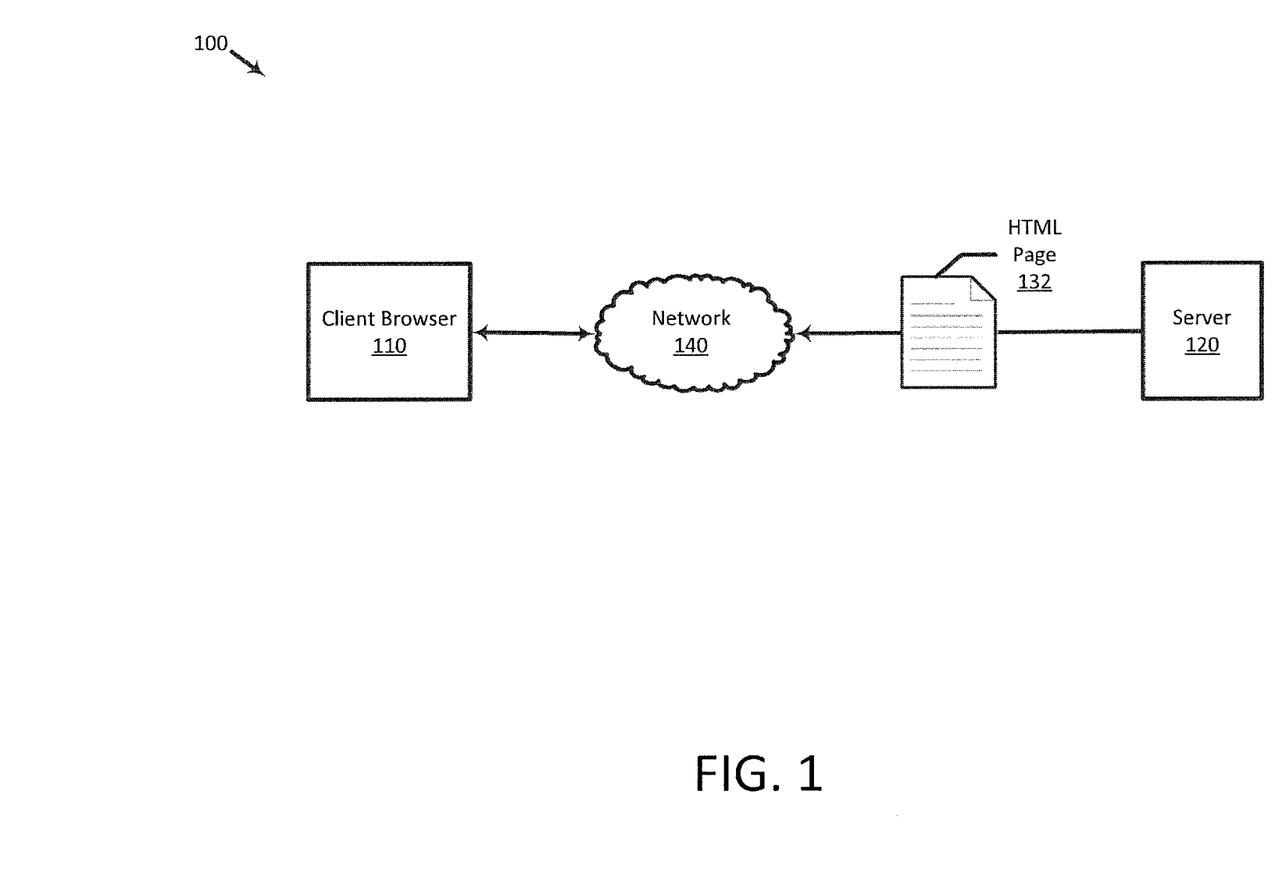
FIG. 1 is an example communication system in accordance with some embodiments.

FIG. 1 is an example communication system 100 in accordance with some embodiments. System 100 includes a client browser 110 that is communicatively coupled to a server 120 via a network 140. Although system 100 is described herein with reference to one client browser and one server, one of skill in the art will recognize that system 100 may include more than one client browser and/or server.

Browsers are software applications that allow a user to view or download content that is available on a network, such as on a website or web application on the World Wide Web. Content may include text, files, images, audio, video, and personal communications. Webpages present such content and are located using uniform resource identifiers (URI) such as a uniform resource locator (URL). Webpages may be retrieved using the Internet Protocol (IP) address of the computer holding the webpage content. Browsers may use a number of protocols and standards to obtain or manage content flow. For example, browsers may use hypertext transfer protocol (HTTP) to fetch content and webpages. HTTP is an application-level protocol providing basic request/response semantics. HTTP can be used for requesting and retrieving objects from a server.

Server 120 can be, for example, and without limitation, a web server, a telecommunications server, a database server, etc. A web server may contain web applications that generate content in response to an HTTP request from a client. The web server packages the generated content and serves the content to a client in the form of an HTTP response. A web server may be a software component that responds to an HTTP request with an HTTP reply. As illustrative examples, the web server may be, without limitation, Apache HTTP Server, Apache Tomcat, Microsoft Internet Information Server, JBoss Application Server, WebLogic Application Server, or Sun Java System Web Server. Trademarks are the properties of their respective owners. A web server may serve content such as hypertext markup language (HTML), extendable markup language (XML), documents, videos, images, multimedia features, or any combination thereof. These examples are strictly illustrative and do not limit the scope of the present disclosure.

Client browser 110 can run on any computing device. Similarly, server 120 can be implemented using any computing device capable of serving data to the client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware can include, but is not limited to, a processor, memory, and user interface display.

Network 140 can be any network or combination of networks that can carry data communication, and may be referred to herein as a computer network. Such network 140 can include, but is not limited to, a wired (e.g., Ethernet) or a wireless (e.g., Wi-Fi and 3G) network, a local area network, medium area network, and/or wide area network such as the Internet. Network 140 can support protocols and technology including, but not limited to, World Wide Web protocols and/or services. Intermediate web servers, gateways, or other servers may be provided between components of system 100 depending upon a particular application or environment.

Client browser 110 may retrieve webpages through a series of requests to and responses from a server. In an example, client browser 110 sends a request for a webpage to server 120 over network 140. Server 120 receives the request, processes the request, and returns a response, such as content for the requested webpage. In an example, server 120 returns an HTML page 132 to client browser 110 in response to client browser 110's request. HTML page 132 is a web document that is in a markup language (HTML) and includes a set of one or more elements (e.g., tags) and a set of one or more rules. A rule may be, for example, a JavaScript that is applied to one or more elements or a Cascading Style Sheet (CSS) element. CSS is a declarative syntax for defining presentation rules, properties and ancillary constructs used to format and render Web documents. By using CSS, the appearance and formatting of elements (e.g., HTML elements) in a document (e.g., HTML page 132) can be quickly changed without adding or removing elements. Accordingly, the size of HTML page 132 may be small, and the scripts that manipulate the document may be fast.

Client browser 110 may download external resources to render HTML page 132. For example, HTML page 132 may contain the addresses of other components such as CSS, JavaScript files, images, and other resources. Client browser 110 requests each of these, in turn, from a server, combining them into the final rendering of the webpage. It may be time consuming for client browser 110 to render HTML page 132 because client browser 110 may perform multiple actions before being able to render HTML page 132. For example, HTML page 132 may include JavaScript, in which case client browser 110 may download and execute JavaScript to generate dynamic content at the client, which takes time. The generated dynamic content then becomes part of the webpage.

Some content in HTML page 132 may be "true" dynamic content, which is likely to change for each page load (e.g., news feeds). True dynamic content may be different across the loading of pages referenced by the same URL and may typically become stale after each page load. For example, on day 1, a user may peruse a social media website and request a webpage that displays news feeds posted by the user's friends. The display of the layout, sidebars, and templates may be the same across page loads, but the posted news feeds that are displayed to the user may change each time the user refreshes or requests the webpage.

Some content in HTML page 132 may be "static" dynamic content, which is "static" in the sense that the static content does not change between page loads, but is "dynamic" in the sense that the content is generated by a client-side script (e.g., a script written in JavaScript). Examples of static dynamic contents are the layout, chrome, banner, form controls (text boxes and buttons), menus, background, etc., of a website after users log-in. The entire user interface of such websites may be generated using, for example, JavaScript, and this content remains the same unless major design changes occur, which does not happen frequently.

It is common for a single webpage to have both true dynamic content and static dynamic content. Although both true dynamic content and static dynamic content are "dynamic content" in the sense that they are both generated on-the-fly, static dynamic content has a higher probability of being the same across page loads. It may be desirable to identify true dynamic content and static dynamic content in a webpage and differentiate them from each other in order to render webpages faster.

To render a webpage faster, client browser 110 may cache webpages. If client browser 110 receives an HTML page 132 that corresponds to a cached webpage from server 120, client browser 110 may display the cached webpage corresponding to HTML page 132, Stale information, however, may be presented to the user (e.g., the wrong "true" dynamic contents may be displayed from cache, such as yesterday's news). The present disclosure provides techniques using a browser/server framework to achieve the contradictory requirements of fast rendering of non-stale dynamic contents while showing minimum stale information.

III. Render the Webpage

To fully load and display a webpage, client browser 110 downloads HTML page 132, parses HTML page 132, builds a document object model (DOM) of HTML page 132's structure, and renders the DOM. In a webpage that has a large amount of dynamic content, the most time consuming actions may be downloading the dynamic content (e.g., JavaScript script from an external source), executing the dynamic content (e.g., executing the JavaScript), and style calculation. After these actions are performed, client browser 110 may render the DOM. Rendering the DOM paints actual webpage content on the screen.

Figure 2:
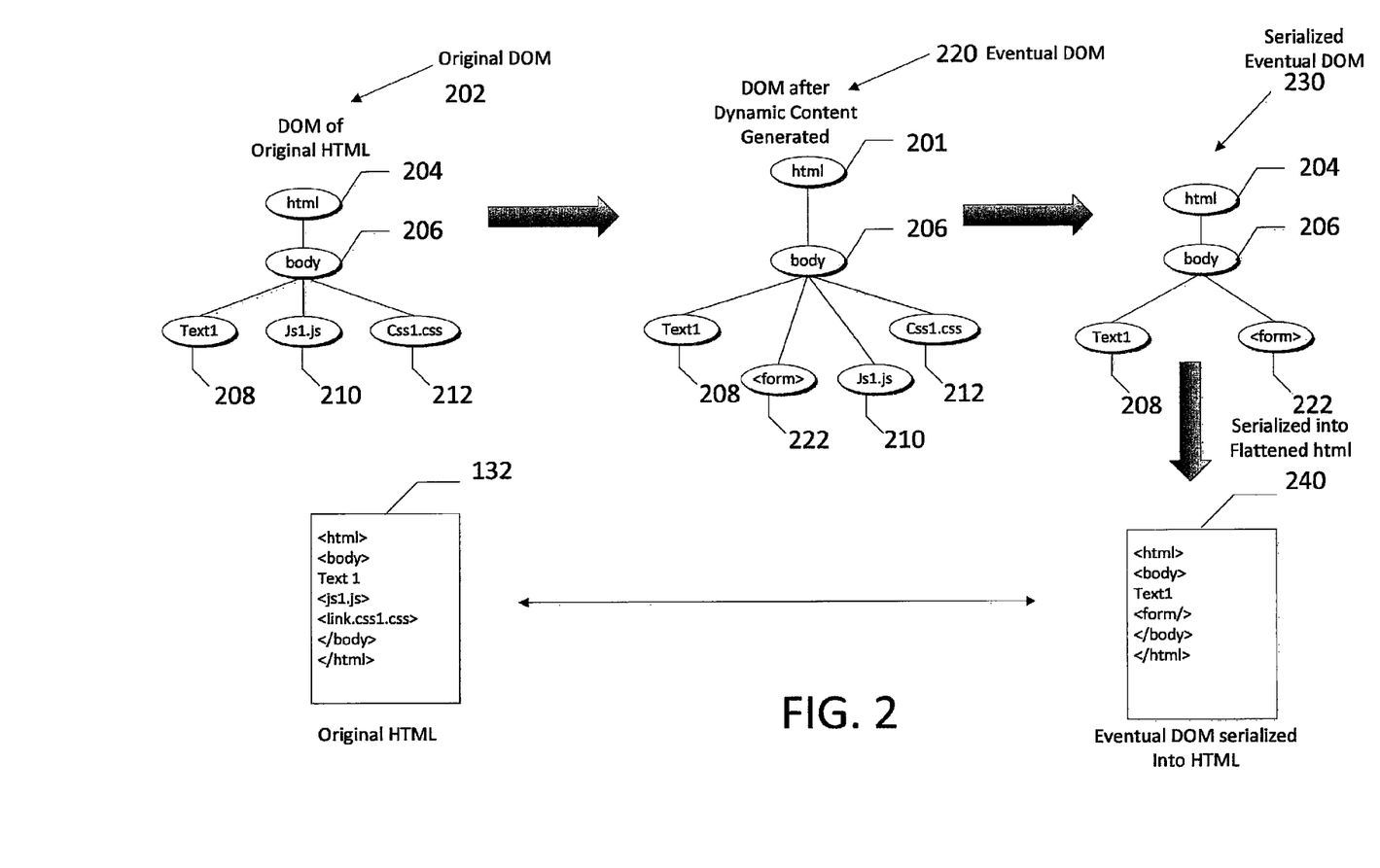
FIG. 2 is a process flow for serializing an eventual DOM in accordance with some embodiments.

FIG. 2 is a process flow 200 for serializing an eventual DOM in accordance with some embodiments. FIG. 2 provides an example of "raw" HTML page 132 that is sent by server 120 to client browser 110 for rendering. Client browser 110 processes HTML page 132 and builds an original DOM 202 that is a representation of HTML page 132 as a structured group of nodes and objects that have properties and methods, Original DOM 202 is visualized as a tree structure for the hierarchy of markup elements within HTML page 132.

The object properties in HTML page 132 are direct mappings to the attributes of the HTML elements. A direct mapping exists between HTML syntax and the DOM. In original DOM 202, "html" node 204 corresponds to the <html> element in HTML page 132, "body" node 206 corresponds to the <body> element in HTML page 132, "Text1" node 208 corresponds to "Text 1" in HTML page 132, "Js1.js" node 210 corresponds to the <js1.js> element in HTML page 132, and "Css1.css" node 212 corresponds to the <link css1.css> element in HTML page 132. HTML page 132 also includes the two ending tags </body> and </html>. A DOM provides programmatic access to styles. CSS objects in the DOM are "live," that is, a change in the style sheet is reflected in the computed and actual style. Accordingly, inline styles on individual elements and style rules may be changed using simple script-based programming. The scripts may be written in, for example, JavaScript, Microsoft JScript, or Microsoft Visual Basic Scripting Edition (VBScript).

A. Build Eventual DOM Based on the Original DOM

Client browser 110 downloads sub-resources discovered in HTML page 132. An example sub-resource is a rule that may be applied to one or more elements included in HTML page 132. Example rules include CSS elements and JavaScript scripts. Client browser 110 may compile and execute the sub-resources while HTML page 132 loads or immediately after HTML page 132 loads. The compilation and execution of the sub-resources may be a synchronous operation. During the compilation and execution of the sub-resources, client browser 110 may process, for example, CSS elements, process images, and/or execute JavaScript scripts.

As a result of executing a sub-resource, client browser 110 may generate dynamic content, build additional DOM nodes from HTML tags, or remove DOM nodes from the DOM. After a webpage with dynamic content is fully loaded, the DOM at that stage may be referred to as an eventual DOM, which contains not only the static content defined in the original HTML page 132, but also the newly added and/or modified dynamic content generated by the sub-rules (e.g., JavaScript scripts, styles specified in CSS, etc.). At this stage, the eventual DOM element's styles are already resolved.

In FIG. 2, client browser 110 processes HTML page 132 and generates an eventual DOM 220 that incorporates the dynamic content of the webpage. Executing JavaScript may add additional DOM nodes that are not in the original HTML page 132 sent from server 120. To generate eventual DOM 220, client browser 110 executes the JavaScript represented by the "Js1.js" node 210 (associated with "js1.js" element in HTML page 132) and generates dynamic content represented by a "form" node 222 in response to executing the script. The JavaScript script represented by the "Js1.js" node 210 dynamically adds a "form" to original DOM 202, by adding a "<form>" tag in the HTML byte stream (e.g., document.write( )) or by directly adding a "form" DOM node to original DOM 202). As illustrated in FIG. 2, eventual DOM 220 includes "form" node 222, which is not included in original DOM 202. Similar to original DOM 202, eventual DOM 220 includes nodes "html" node 204, "body" node 206, "Text1" node 208, "Js1.js" node 210, and "Css1.css" node 212. In addition to these nodes, eventual DOM 220 also includes "form" node 222. Client browser 110 applies the styles specified by "Css1.css" node 212 to the appropriate HTML tags in HTML page 132 and renders eventual DOM 220 to a user.

B. Serialize the Eventual DOM

Client browser 110 renders eventual DOM 220 by building a DOM that corresponds to the visual representation of the eventual DOM and paints it on a display of a device coupled to client browser 110. Client browser 110 may serialize eventual DOM 220 by building a serialized eventual DOM 230 and serializing it into a file. It may be advantageous to serialize the serialized eventual DOM to identify true dynamic content and static dynamic content and render webpages quickly, as further discussed in the present disclosure.

1. Build Serialized Eventual DOM Corresponding to Visual Representation of Eventual DOM Client browser 110 may generate a serialized eventual DOM 230 by identifying the dynamic content in eventual DOM 220, removing the nodes representing the set of rules (e.g., "Js1.js" node 210 and "Css1.css" node 212) including the dynamic content from eventual DOM 220, and in-lining the dynamic content into serialized eventual DOM 230. Accordingly, client browser 110 removes the JavaScript script and CSS styles from eventual DOM 220 and in-lines this dynamic content in serialized eventual DOM 230. In some examples, client browser 110 generates serialized eventual DOM 230 by moving one or more non-in-line rules in eventual DOM 220 to in-line rules.

Serialized eventual DOM 230 includes nodes 204, 206, 208', and 222'. Nodes 204 and 206 in eventual DOM 220 may be the same as nodes 204 and 206 in serialized eventual DOM 230. The appropriate styles represented by "Css1.css" node 212 in eventual DOM 220 are applied to the appropriate HTML tags/DOM nodes (e.g., the text represented by "Text1" node 208 and/or "form" node 222 in eventual DOM 220). Inline styles are CSS style assignments that have been applied to HTML element(s) using the style attribute. In some examples, client browser 110 may inline the CSS styles by copying contents of the external CSS file stored at the location represented by the "<link css1.css>" element in HTML page 132 and paste the contents between style tags in the head section of HTML page 132.

2. Serialize the Eventual DOM into a File

Client browser 110 may serialize serialized eventual DOM 230 into a serialized file 240 (e.g., HTML file), with all of the elements' styles in-lined. Serialized file 240, which is a serialization of eventual DOM 220, is a "flattened" file that contains both static and dynamic content, with the correct styles. Serialized file 240 may be an HTML file that shows identical content as the "real webpage" that is eventually displayed to the user. Client browser 110 stores serialized file 240 in a cache for later retrieval and loading. Next time, upon receiving a request to display the webpage referenced by the URL associated with HTML page 132, client browser 110 may load serialized file 240. Serialized file 240 has the same appearance as HTML page 132, but may be displayed much faster because it is unnecessary to apply the rules and/or search for external sources. For example, it may be unnecessary for client browser 110 to execute the JavaScript or apply the CSS elements, which are typically time consuming steps in displaying a webpage. Accordingly, faster page display may be achieved the next time the webpage is requested.

If a serialized eventual DOM of the same webpage is available, the serialized file may be displayed first (faster), while the real webpage is loading in the background. The real webpage may be displayed when it is finished loading in the background. Serialized file 240 may, however, show stale information. For example, if a website includes a newsfeed, the user may be shown an outdated newsfeed. To avoid the display of stale information, client browser 110 may identify the dynamic content in serialized file 240 and remove some of the dynamic content or replace it with generic and/or dummy place holders.

To identify dynamic content, client browser 110 may identify a difference between an eventual DOM and an original main HTML's corresponding original DOM before applying any of the rules in the HTML document (e.g., JavaScript and CSS elements). Client browser 110 may determine the difference between eventual DOM 220 and original DOM 202, removing the difference from the eventual DOM, and then display the eventual DOM, where the difference is the dynamic content. This approach, however, may remove all dynamic content (both true dynamic content and static dynamic content). The net effect may be similar to disabling JavaScript in the browser and then loading the original HTML. Further, the net effect may be different because the styles may be modified by JavaScript as well, which are kept in the eventual DOM, but not in the original raw HTML. For websites that have a lot of static dynamic content, almost nothing may be shown to the user because none or almost none of the user interface elements is be displayed to the user. Accordingly, it may be desirable to differentiate between true dynamic content and static dynamic content and remove only the true dynamic content.

In some embodiments, a method of generating a serialized DOM includes parsing a first web document. The first web document may be in a markup language and include a set of elements and a set of rules. The method may also include applying the set of rules to one or more elements of the set of elements and building an eventual DOM in accordance with parsing the web document and applying the set of rules to the web document. The method may further include rendering the eventual DOM on a display of a computing device and identifying a set of rules included in the eventual DOM. The method may also include removing the set of rules from the eventual DOM and serializing the eventual DOM into a second web document. The serialized eventual DOM may be cached in browser's cache.

C. Identify and Process the True and Static Dynamic Content

To avoid the display of stale information, client browser 110 identifies the true dynamic content and static dynamic content in serialized file 240, and removes at least some of the static dynamic content or replaces it with generic and/or dummy place holders. To identify the true dynamic content, client browser 110 may maintain eventual DOMs associated with webpage loads and store the respective eventual DOM each time client browser 110 loads a webpage corresponding to one or more of the same URLs. After each page load, client browser 110 may save serialized file 240 (e.g., a serialized eventual DOM serialized in an HTML file) for later use.

In an example, client browser 110 generates a plurality of eventual DOMs associated with requests for the same webpage (webpage referenced by the same URL) and stores the respective eventual DOM in a cache each time client browser 110 loads the same webpage. Client browser 110 then determines differences between the plurality of eventual DOMs for the same webpage. The portions in the compared plurality of eventual DOMs that are different may be identified as the true dynamic content.

Figure 3:
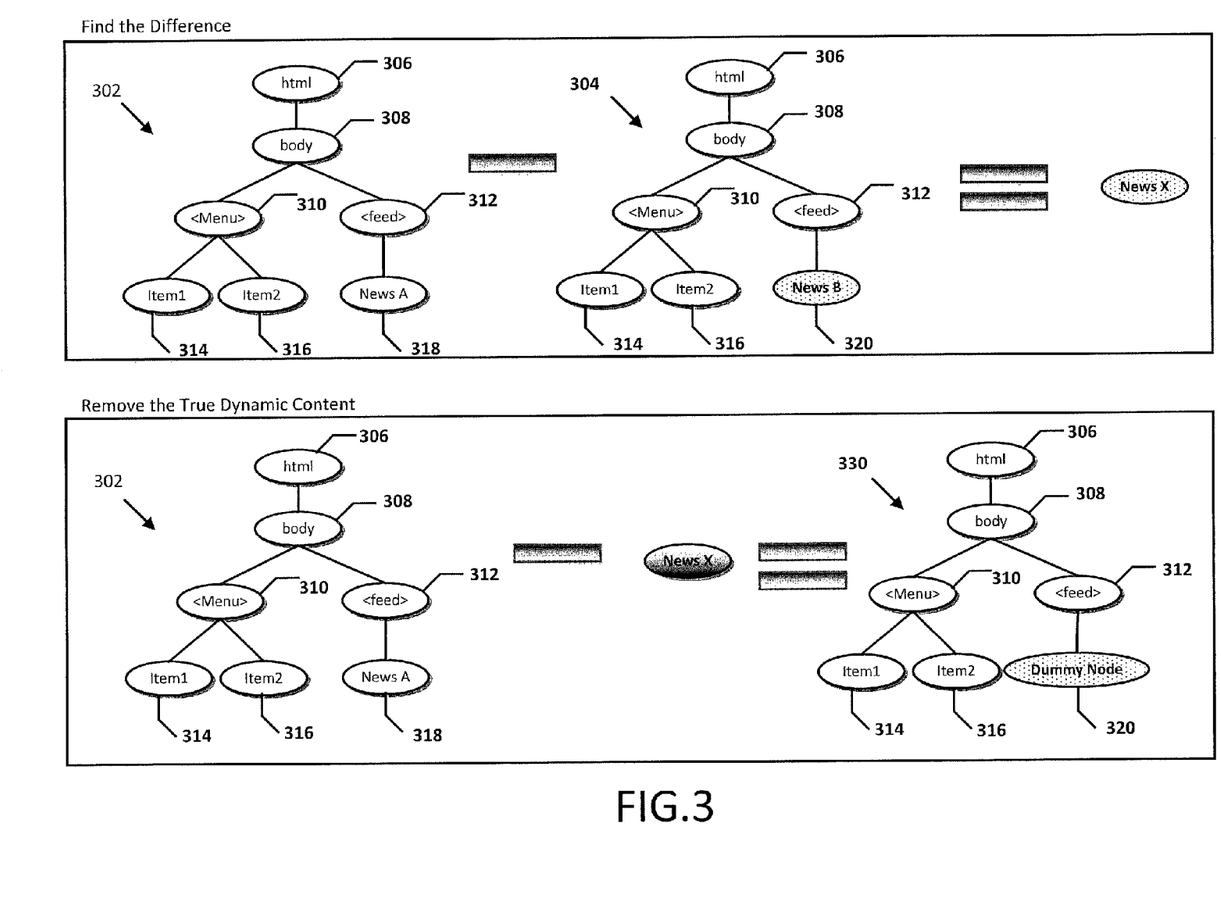
FIG. 3 is a process flow for identifying true dynamic content in a web document in accordance with some embodiments.

FIG. 3 is a process flow 300 for identifying true dynamic content in a web document in accordance with some embodiments. FIG. 3 includes a serialized eventual DOM 302 and a serialized eventual DOM 304. Serialized eventual DOMs 302 and 304 may be generated as indicated above and are associated with the same URL. Serialized eventual DOMs 302 and 304 may be versions of a serialized eventual DOM for the same webpage, and is maintained and stored in memory.

Serialized eventual DOM 302 includes an "html" node 306, "body" node 308, "<Menu>" node 310, "<feed>" node 312, "Item1" node 314, "Item2" node 316, and a "News A" node 318. Serialized eventual DOM 304 includes "html" node 306, "body" node 308, "<Menu>" node 310, "<feed>" node 312, "Item1" node 314, "Item2" node 316, and a "News B" node 320. The "html" node 306, "body" node 308, "<Menu>" node 310, and "<feed>" node 312 may be "static" nodes that represent HTML elements/subtree. The "Item1" node 314, "Item2" node 316, "News A" node 318, and "News B" node 320 may be dynamic content that is generated by JavaScript. If client browser 110 were to load a webpage from a social media website on days 1 and 2, client browser 110 may store both versions of serialized eventual DOMs 302 and 304 associated with these two webpage loads into a cache or a database.

In an example, client browser 110 compares serialized eventual DOM 302 and serialized eventual DOM 304 and identifies one or more portions that have changed. The one or more identified portions is the true dynamic content across the serialized eventual DOMs. Serialized eventual DOM 302 includes "News A" content and serialized eventual DOM 304 includes "News B" content. Accordingly, "News X" is identified as the true dynamic content. The true dynamic content (e.g., newsfeeds and contents of the news) is different between the two serialized eventual DOMs, but the static dynamic content (e.g., user interface elements) remains the same. If client browser 110 were to cache serialized eventual DOM 302 and display it to the user rather than serialized eventual DOM 304, the user may be presented with a stale newsfeed (represented by "News A" content) rather than the most up-to-date newsfeed (represented by "News B" content). To avoid displaying stale information to the user, client browser 110 removes the true dynamic content to produce a common serialized eventual DOM 330. Common serialized eventual DOM 330 is the DOM with the true dynamic content removed from serialized eventual DOM 302 or serialized eventual DOM 304.

In some examples, client browser 110 removes the true dynamic content by removing the node representing the true dynamic content from serialized eventual DOM 302 (or serialized eventual DOM 304). If the node representing the true dynamic content is removed, the layout of the webpage may change. For example, a big banner image may be true dynamic content, and if the big banner image is removed the rest of the webpage's layout may appear odd to the user. In the example illustrated in FIG. 3, rather than remove the node representing the true dynamic content (e.g., node 318), client browser 110 may replace the node representing the true dynamic content with a dummy node 332 that acts as a placeholder element. Dummy node 332 may have the same size (or even color scheme, if for example it is a big image) to keep the webpage layout the same as before.

True dynamic content may also be removed from sub-DOMs. For example, iFrames may have their own sub-DOM, and HTML documents are generally not cacheable. Accordingly, client browser 110 may keep the iFrame in the common serialized eventual DOM or may replace the iFrame with an equally sized dummy node if the source URL does not change.

After removing the true dynamic content (e.g., "News X") by removing the node representing the true dynamic content or replacing the node with a dummy node, the rest of the serialized eventual DOM may be displayed, with as few stale contents as possible. Common serialized eventual DOM 330 does not include the potentially stale content. By identifying the differences between the original HTML page (the actual HTML page that is downloaded from the website) and the HTML of the serialized eventual DOM, or by identifying the differences between different versions of the serialized eventual DOMs, a common serialized eventual DOM may be generated without containing any true dynamic content. The comparison of the serialized eventual DOMs may be performed at different times to refine the eventual DOM in order to exclude the true dynamic content. Additionally, more than two different versions of the serialized eventual DOM may be compared.

D. Mechanisms for Serialized Eventual DOM Management and Delivery

In some embodiments, on the client side, client browser 110 may save the serialized eventual DOM into a local cache or database indexed by the URL of the webpage. Client browser 110 may also set an expiration date for the serialized eventual DOM. Identifying the difference(s) between different versions of serialized eventual DOMs may be performed periodically in the background. In an example, every time a webpage is loaded, the local cache or database may be queried using the URL to determine whether the serialized eventual DOM of the same URL may be used. Client browser 110 may submit the serialized eventual DOM to the server as well, if the server accepts metadata from clients to be used next time the same URL is requested.

As described above, after each page load a serialized eventual DOM HTML may be generated for later use and stored. This serialized eventual DOM generation and comparison may be performed either at the client side (in client browser 110) or server side (e.g., a web proxy or a CDN edge server). Accordingly, although client browser 110 is described as generating and/or storing the eventual DOMs and serialized eventual DOMs, it should also be understood that a server may generate and/or store the eventual DOM and/or the serialized eventual DOMs as well (e.g., in a content delivery network (CDN)). For example, each time the webpage is requested, a CDN may cache the serialized eventual DOMs at the time of the hit.

In some embodiments, on the server side, a server (e.g., CDN edge server or proxy server) may receive a request for the same URL from multiple users. In an example, each time a URL request is served by the server, the server generates a serialized eventual DOM server side and saves the serialized eventual DOM on the server for that URL. The server may generate an eventual DOM by, for example, using a headless browser such as PhantomJS.

Figure 4:
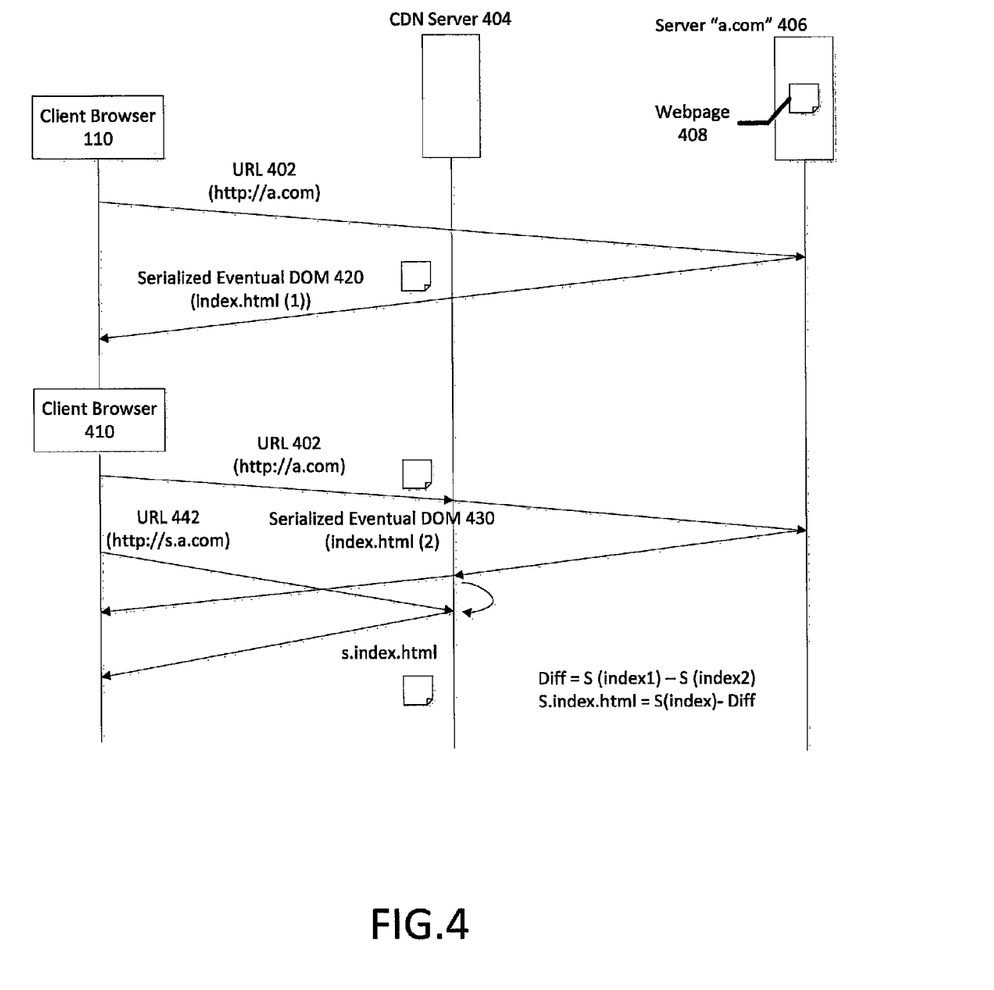
FIG. 4 illustrates an example swim diagram of communications between clients and a server for providing a difference between two webpages in accordance with some embodiments.

FIG. 4 illustrates an example swim diagram of communications between clients and a server for providing a difference between two webpages in accordance with some embodiments. In FIG. 4, a server "a.com" 406 receives multiple requests from client browsers 110 and 410. Client browser 110 may send a request for a webpage 408 referenced by a URL "http://a.com" 402. The request may be sent from client browser 110 to a CDN server 404, which passes the request to server "a.com" 406, which stores webpage 408 referenced by URL "http://a.com" 402. Server "a.com" 406 sends webpage 408 (represented by index.html(1)) to CDN server 404, which passes the webpage to client browser 110. CDN server 404 may generate a serialized eventual DOM 420 based on "index.html(1)" and save the serialized eventual DOM 420 on CDN server 404 for URL "http://a.com" 402.

At a later point in time, client browser 410 may send a request for webpage 408 referenced by URL "http://a.com" 402. The request may be sent from client browser 410 to CDN server 404, which passes the request to server "a.com" 406, Server "a.com" 406 sends webpage 408 (represented by index.html(2)) to CDN server 404, which passes the webpage to client browser 110. CDN server 404 may generate a serialized eventual DOM 430 based on "index.html(2)" and save the serialized eventual DOM 430 on CDN server 404 for URL "http://a.com" 402.

Different versions of a serialized eventual DOM (e.g., serialized eventual DOM 420 and serialized eventual DOM 430) for the same URL (e.g., "http://a.com) but for different users (e.g., client browsers 110 and 410) may be compared with each other to identify the different content, so that the final serialized eventual DOM may contain only content that is common to all users. The final serialized eventual DOM that does not contain the true dynamic content may be referred to as the common serialized eventual DOM.

CDN server 404 may continue to generate serialized eventual DOMs and compare different versions of serialized eventual DOMs to each other. In FIG. 4, CDN server 404 generates serialized eventual DOMs 420 and 430 and compares them to determine their difference(s) as discussed in relation to FIG. 3. CDN server 404 may identify the difference(s), which may be written as "Diff=S(index 1)-(index 2)", between serialized eventual DOMs 420 and 430 as being the true dynamic content, and remove the true dynamic content from one of the serialized eventual DOMs 420 or 430 (e.g., by removing the node representing the true dynamic content from the serialized eventual DOM 420 or 430, or by replacing the node representing the true dynamic content with a dummy node in serialized eventual DOM 420 or 430).

After the unchanged part(s) of a serialized eventual DOM stabilizes, CDN server 404 may generate a common serialized eventual DOM 440 that removes the difference(s) between serialized eventual DOMs 420 and 430 serve the common serialized eventual DOMs to clients. Common serialized eventual DOM 440 is represented by "s.index.html=S(index1)-Diff." At a later point in time, client browser 410 may send another request for webpage 408.

E. Mechanisms for Displaying the Requested Webpage

Using the techniques discussed in the present disclosure, webpages may be rendered in a variety of ways. In an example, in response to this request, CDN server 404 may serve common serialized eventual DOM 440, which does not include any dynamic content, to client browser 410. CDN server 404 may deliver common serialized eventual DOM 440 to client browser 410 using a different URL 442. In another example, CDN server 404 may embed or inline the true dynamic content into the main HTML to be used by the JavaScript display manager. Accordingly, the common serialized eventual DOM may be generated at the client and/or at the server, and delivered to the client through a separate URL or embedded in the main HTML document.

1. Dual Render Process Approach

Figure 5:
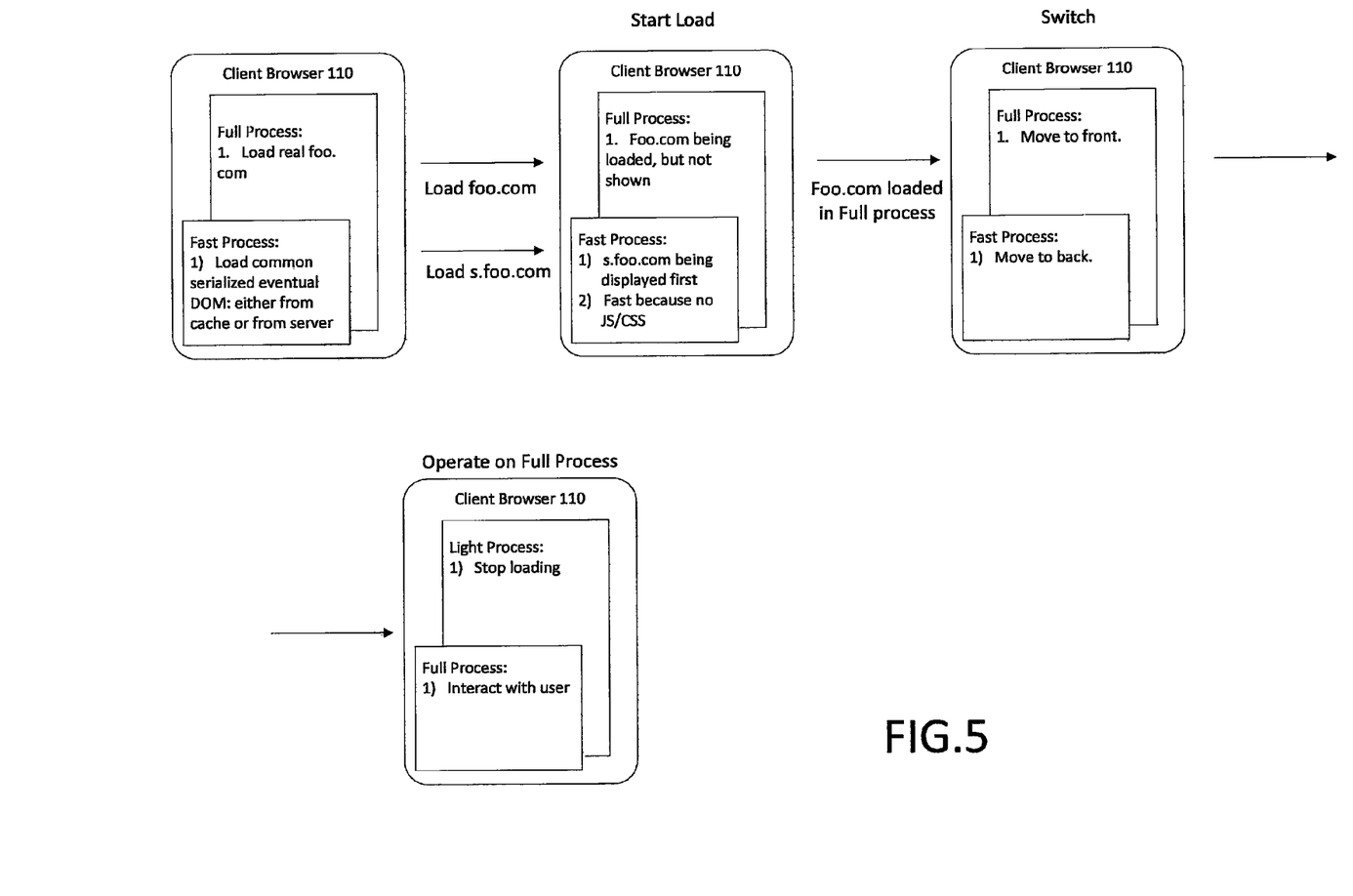
FIG. 5 illustrates an example process flow for displaying the common serialized eventual DOM and real webpage using the dual render process approach in accordance with some embodiments.

In some embodiments, client browser 110 may use a dual render process approach to display the webpage. FIG. 5 illustrates an example process flow for displaying the common serialized eventual DOM and real webpage using the dual render process approach in accordance with some embodiments. In FIG. 5, client browser 110 requests "foo.com" from a server. In response to the request, client browser 110 may create two render processes, one for requesting and rendering the common serialized eventual DOM either from a cache or from the server (e.g., CDN server 404 or a proxy server), and one for the real webpage that is to be displayed to the user.

The first render process is the "fast process" and is used to achieve of the illusion that the webpage is being quickly rendered. In the first render process, client browser 110 loads the common serialized eventual DOM either from the cache or from the server (using "s.foo.com") and displays the common serialized eventual DOM to the user first. Accordingly, client browser 110 displays the webpage referenced by "s.foo.com" first. The user is able to view the static dynamic content in the webpage quickly because the dynamic content has been removed (e.g., JavaScript or CSS elements). The second render process is the "full process" and is used to request and render the real webpage in the background. In the second render process, client browser 110 loads the real webpage (using "foo.com"), but it is not yet shown to the user. Client browser 110 displays the real webpage to the user when it completes its rendering of the real webpage; ensuring that the webpage eventually shown to the user is not broken.

Referring back to FIG. 4 and using the dual render process approach, the next time the webpage referenced by URL "http://a.com" 402 is loaded, client browser 110 may display common serialized eventual DOM 440 to the user in the foreground, while a background process renders the actual webpage in the background. Common serialized eventual DOM 440 is the current version of a serialized eventual DOM, and client browser 110 performs another difference in the background between the previous version of a serialized eventual DOM and the current version of a serialized eventual DOM. Accordingly, client browser 110 may render processes to process both the serialized eventual DOM and the real webpage but show the serialized eventual DOM first.

2. Embedded JavaScript Approach

In some embodiments, client browser 110 may use an embedded JavaScript approach. In the embedded JavaScript approach, the serialized eventual DOM content is embedded in the main HTML of the webpage. Accordingly, the webpage also includes JavaScript. Client browser 110 displays the serialized eventual DOM contents first, then transits to displaying the real webpage. The embedded JavaScript approach may be performed if the serialized eventual DOM is available from the server side. The server may modify the original HTML by embedding the serialized eventual DOM in it, and client browser 110 may use JavaScript to load and display the serialized eventual DOM and the real webpage at different times.

IV. Example Method

Figure 6:
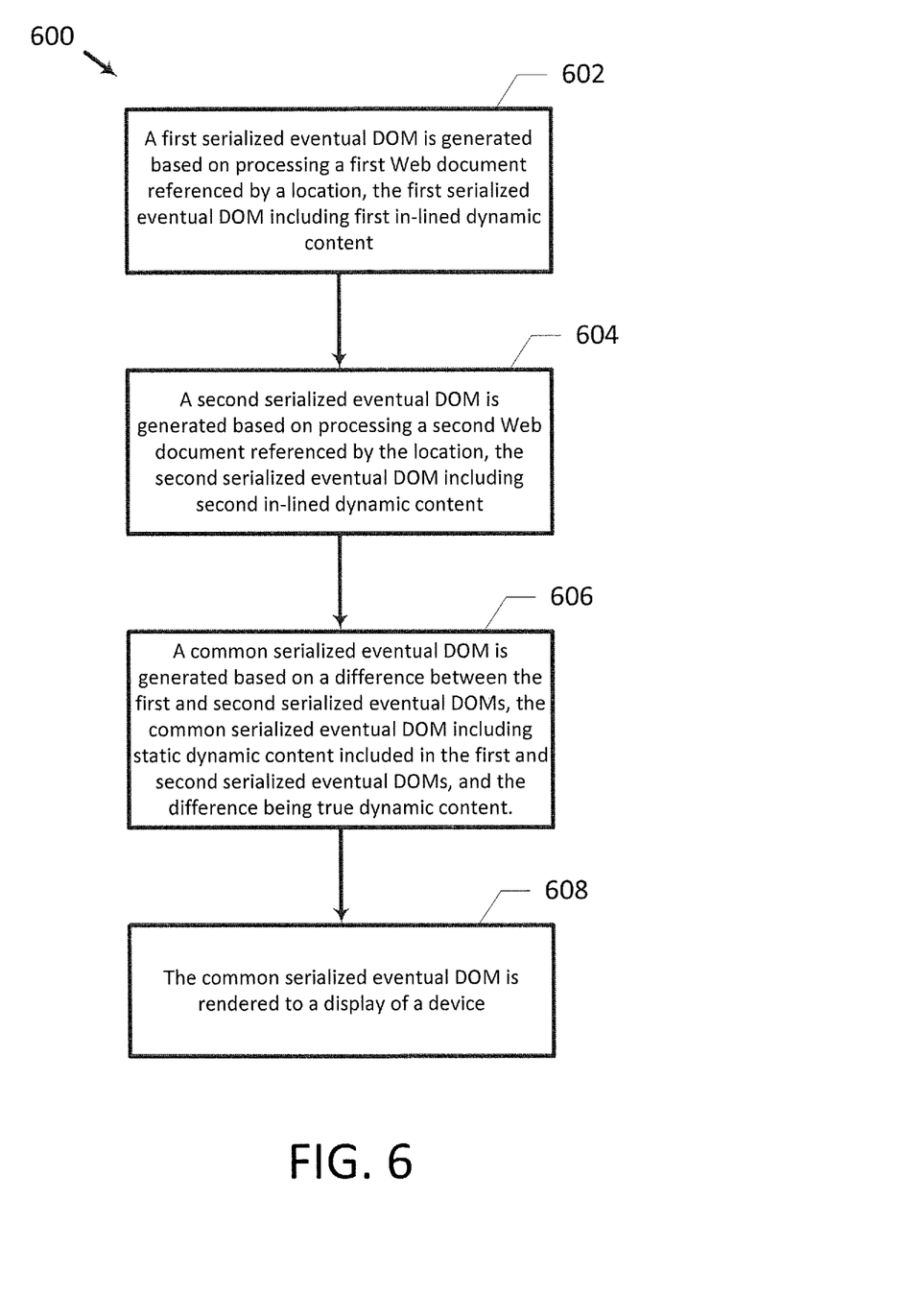
FIG. 6 is a flowchart illustrating a method of rendering a webpage in accordance with some embodiments.

FIG. 6 is a flowchart illustrating a method 600 of rendering a webpage in accordance with some embodiments. Method 600 is not meant to be limiting and may be used in other applications.

In FIG. 6, method 600 includes blocks 602-608. In a block 602, a first serialized eventual DOM is generated based on processing a first Web document referenced by a location, the first serialized eventual DOM including first in-lined dynamic content. In an example, client browser 110 generates a serialized eventual DOM 302 based on processing HTML page 132 referenced by URL, serialized eventual DOM 302 including in-lined dynamic content. In a block 604, a second serialized eventual DOM is generated based on processing a second Web document referenced by the location, the second serialized eventual DOM including second in-lined dynamic content. In an example, client browser 110 generates serialized eventual DOM 304 based on processing a second Web document referenced by the location, serialized eventual DOM 304 including second in-lined dynamic content.

In a block 606, a common serialized eventual DOM is generated based on a difference between the first and second serialized eventual DOMs, the common serialized eventual DOM including static dynamic content included in the first and second serialized eventual DOMs, and the difference being true dynamic content. In an example, client browser 110 generates common serialized eventual DOM 330 based on a difference between serialized eventual DOMs 302 and 304, common serialized eventual DOM 330 including static dynamic content included in serialized eventual DOMs 302 and 304, and the difference being true dynamic content. In a block 608, the common serialized eventual DOM is rendered to a display of a device. In an example, client browser 110 renders common serialized eventual DOM 330 to a display of a device.

In some embodiments, one or more actions illustrated in blocks 602-608 may be performed for any number of webpages loaded by client browser 110. Additionally, it is also understood that additional processes may be inserted before, during, or after blocks 602-608 discussed above. It is also understood that one or more of the blocks of method 600 described herein may be omitted, combined, or performed in a different sequence as desired.

FIGS. 1-6 are merely examples, which should not unduly limit the scope of the claims. For example, for brevity, the disclosure may describe the client application as being a client browser, but this is not intended to be limiting and it should be understood that other client applications are within the scope of the disclosure.

The present disclosure provides techniques to achieve fast rendering of highly dynamic websites while avoiding stale content. Additionally, approaches from different aspects may be combined to form a working framework. In an example, a client browser may employ the dual rendering approach to utilize the serialized eventual DOM generated on the server side, with all true dynamic contents removed. In another example, a browser may cache all serialized eventual DOMs with no dynamic contents. Additionally, by looking at content in the cache and content requested by the client browser and content returned by the server, client browser 110 may identify if any serialized eventual DOMs or any form of resources to facilitate fast rendering are being delivered and processed.

V. Example Device

Figure 7:
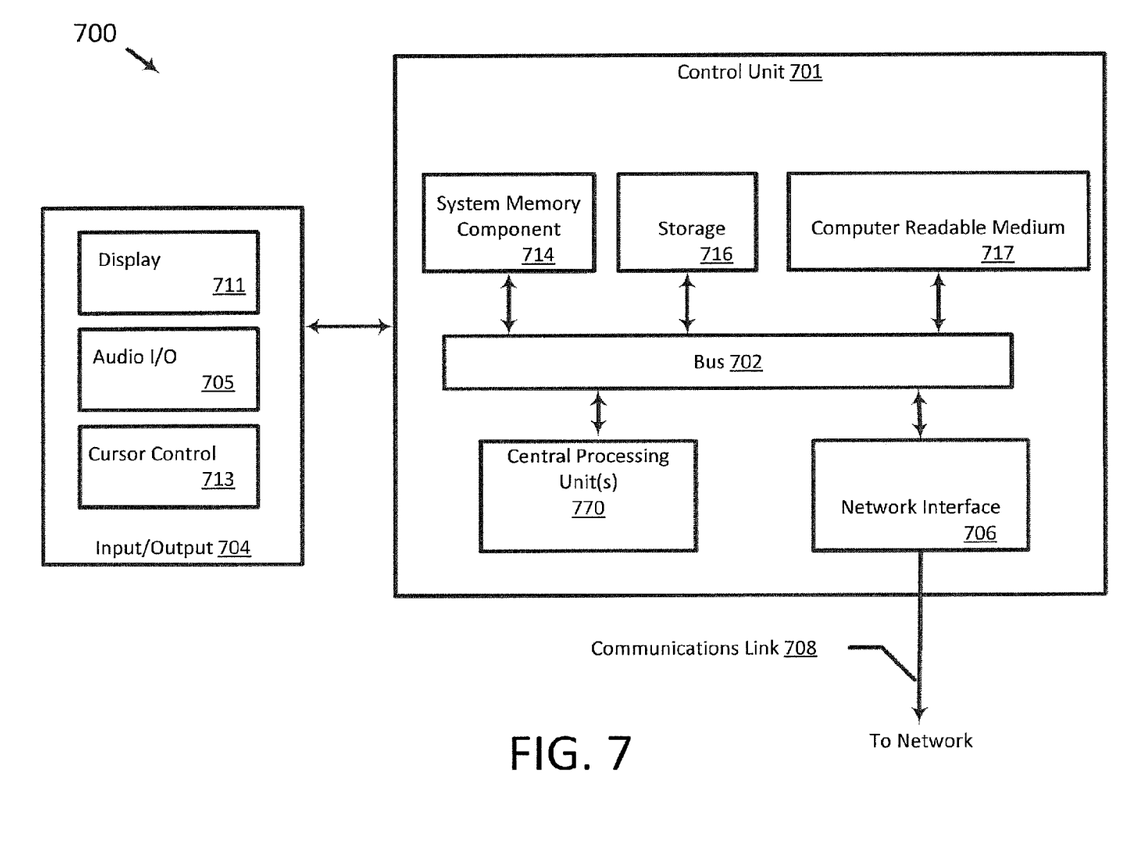
FIG. 7 is a block diagram of a computer system suitable for implementing one or more embodiments of the present disclosure.

FIG. 7 is a block diagram of an example computer system 700 suitable for implementing any of the embodiments disclosed herein. In various implementations, computer system 700 may be a server. In a various implementations, client browser 110 may run in computer system 700.

Computer system 700 includes a control unit 701 coupled to an input/output (I/O) 704 component. Control unit 701 may include one or more central processing units (CPUs) 770 and may additionally include one or more storage devices each selected from a group including floppy disk, flexible disk, hard disk, magnetic tape, any other magnetic medium, CD-ROM, any other optical medium, random access memory (RAM), programmable read-only memory (PROM), erasable ROM (EPROM), FLASH-EPROM, any other memory chip or cartridge, and/or any other medium from which a processor or computer is adapted to read. The one or more storage devices may include stored information that may be made available to one or more computing devices and/or computer programs (e.g., clients) coupled to computer system 700 using a computer network (not shown). The computer network may be any type of network including a LAN, a WAN, an intranet, the Internet, a cloud, and/or any combination of networks thereof that is capable of interconnecting computing devices and/or computer programs in the system.

Computer system 700 includes a bus 702 or other communication mechanism for communicating information data, signals, and information between various components of computer system 700. Components include an input/output (I/O) components 704 for processing user actions, such as selecting keys from a keypad/keyboard or selecting one or more buttons or links, etc., and sends a corresponding signal to bus 702. I/O component 704 may also include an output component such as a display 711, and an input control such as a cursor control 713 (such as a keyboard, keypad, mouse, etc.). An audio I/O component 705 may also be included to allow a user to use voice for inputting information by converting audio signals into information signals. Audio I/O component 705 may allow the user to hear audio.

A transceiver or network interface 706 transmits and receives signals between computer system 700 and other devices via a communication link 718 to a network. In an embodiment, the transmission is wireless, although other transmission mediums and methods may also be suitable. Additionally, display 711 may be coupled to control unit 701 via communications link 718.

CPU 770, which may be a micro-controller, digital signal processor (DSP), or other processing component, processes these various signals, such as for display on display 711 of computer system 700 or transmission to other devices via communication link 718. CPU 770 may also control transmission of information, such as cookies or IP addresses, to other devices. Components of computer system 700 also include a system memory component 714 (e.g., RAM), a static storage component 716 (e.g., ROM), and/or a computer readable medium 717. Computer system 700 performs specific operations by CPU 770 and other components by executing one or more sequences of instructions contained in system memory component 714. Logic may be encoded in computer readable medium 717, which may refer to any medium that participates in providing instructions to CPU 770 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 714, and transmission media include coaxial cables, copper wire, and fiber optics, including wires that include bus 702. In an embodiment, the logic is encoded in non-transitory computer readable medium. Computer readable medium 717 may be any apparatus that can contain, store, communicate, propagate, or transport instructions that are used by or in connection with CPU 770. Computer readable medium 717 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 600) to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of rendering a webpage, comprising:
generating a first serialized eventual document object model (DOM) based on processing a first Web document referenced by a location, the first Web document associated with first client-side generated dynamic content including static dynamic content and first true dynamic content, and the first client-side generated dynamic content in-lined in the first serialized eventual DOM;
generating a second serialized eventual DOM based on processing a second Web document referenced by the location, the second Web document associated with second client-side generated dynamic content including the static dynamic content and second true dynamic content, and the second client-side generated dynamic content in-lined in the second serialized eventual DOM;
generating a common serialized eventual DOM based on a difference between the first true dynamic content in-lined in the first serialized eventual DOM and the second true dynamic content in-lined in the second serialized eventual DOM, the common serialized eventual DOM including the static dynamic content and absent of the first true dynamic content; and
rendering the common serialized eventual DOM to a display of a device.

2. The method of claim 1, wherein generating the common serialized eventual DOM includes identifying one or more differences between the first and second serialized eventual DOMs and removing the one or more differences from the first serialized eventual DOM.

3. The method of claim 1, further comprising:
parsing the first Web document, the first Web document being in a markup language and including a set of elements and a set of rules;
applying the set of rules to one or more elements of the set of elements;
generating an eventual DOM in accordance with the parsing and the applying, the eventual DOM including the first client-side generated dynamic content generated based on applying the set of rules; and
serializing the eventual DOM to produce the first serialized eventual DOM.

4. The method of claim 3, wherein generating the first serialized eventual DOM includes moving one or more non-in-line rules in the first eventual DOM to in-line rules.

5. The method of claim 4, wherein a rule includes a client-side script.

6. The method of claim 4, wherein a rule is a formatting rule that is applied to one or more elements in the first Web document.

7. The method of claim 3, wherein the first and second serialized eventual DOMs are different versions of the eventual DOM.

8. The method of claim 1, further comprising:
serializing the first serialized eventual DOM into a file; and
caching the file.

9. The method of claim 1, wherein rendering the common serialized eventual DOM includes rendering the common serialized eventual DOM in a foreground, the method further comprising:
retrieving the common serialized eventual DOM from a cache;
receiving a current request for a third Web document referenced by the location;
in a background process, composing a current DOM for the current request and rendering the current DOM;
replacing the rendered current DOM with the rendered common serialized eventual DOM after the current DOM has been rendered.

10. The method of claim 1, further comprising:
generating a third serialized eventual DOM based on processing a third Web document referenced by the location, the third serialized eventual DOM including in-lined dynamic content;
generating a second common serialized eventual DOM based on a second difference between the second and third serialized eventual DOMs, the second common serialized eventual DOM including the static dynamic content included in the second and third serialized eventual DOMs and being absent of the second true dynamic content; and
rendering the second common serialized eventual DOM to the display of the device.

11. The method of claim 1, wherein the location is a uniform resource locator (URL).

12. A system for rendering a webpage, comprising:
a client browser that generates a first serialized eventual document object model (DOM) based on processing a first Web document referenced by a location and generates a second serialized eventual DOM based on processing a second Web document referenced by the location, wherein the first Web document is associated with first client-side generated dynamic content including static dynamic content and first true dynamic content, and the first client-side generated dynamic content is in-lined in the first serialized eventual DOM, and wherein the second Web document is associated with second client-side generated dynamic content including the static dynamic content and second true dynamic content, and the second client-side generated dynamic content is in-lined in the second serialized eventual DOM;
wherein the client browser generates a common serialized eventual DOM based on a difference between the first true dynamic content in-lined in the first serialized eventual DOM and the second true dynamic content in-lined in the second serialized eventual DOM, and the common serialized eventual DOM includes the static dynamic content and is absent of the first true dynamic content;
wherein the client browser renders the common serialized eventual DOM to a display of a device.

13. The system of claim 12, wherein the client browser identifies one or more differences between the first and second serialized eventual DOMs and removes the one or more differences from the first serialized eventual DOM.

14. The system of claim 12, wherein the client browser parses the first Web document, and the first Web document is in a markup language and includes a set of elements and a set of rules, wherein the client browser applies the set of rules to one or more elements of the set of elements and generates an eventual DOM in accordance with the parsing and the applying, and wherein the eventual DOM includes first dynamic content generated based on applying the set of rules.

15. The system of claim 14, wherein the client browser removes one or more rules from the first eventual DOM and incorporates the one or more removed rules in-line into the first eventual DOM.

16. The system of claim 15, wherein a rule includes a client-side script.

17. The system of claim 16, wherein the client-side script is in the JAVASCRIPT programming language.

18. The system of claim 14, wherein the first and second serialized eventual DOMs are different versions of the eventual DOM.

19. A non-transitory computer-readable medium having stored thereon computer-executable instructions for performing operations, comprising:
generating a first serialized eventual document object model (DOM) based on processing a first Web document referenced by a location, the first Web document associated with first client-side generated dynamic content including static dynamic content and first true dynamic content, and the first client-side generated dynamic content in-lined in the first serialized eventual DOM;
generating a second serialized eventual DOM based on processing a second Web document referenced by the location, the second Web document associated with second client-side generated dynamic content including the static dynamic content and second true dynamic content, and the second client-side generated dynamic content in-lined in the second serialized eventual DOM;
generating a common serialized eventual DOM based on a difference between the first true dynamic content in-lined in the first serialized eventual DOM and the second true dynamic content in-lined in the second serialized eventual DOM, the common serialized eventual DOM including the static dynamic content and absent of the first true dynamic content; and
rendering the common serialized eventual DOM to a display of a device.

20. A system for rendering a webpage, comprising:
means for generating a first serialized eventual document object model (DOM) based on processing a first Web document referenced by a location, the first Web document associated with first client-side generated dynamic content including static dynamic content and first true dynamic content, and the first client-side generated dynamic content in-lined in the first serialized eventual DOM;
means for generating a second serialized eventual DOM based on processing a second Web document referenced by the location, the second Web document associated with second client-side generated dynamic content including the static dynamic content and second true dynamic content, and the second client-side generated dynamic content in-lined in the second serialized eventual DOM;
means for generating a common serialized eventual DOM based on a difference between the first true dynamic content in-lined in the first serialized eventual DOM and the second true dynamic content in-lined in the second serialized eventual DOM, the common serialized eventual DOM including the static dynamic content and absent of the first true dynamic content; and
means for rendering the common serialized eventual DOM to a display of a device.

* * * * *